United States Patent
Reach et al.

(10) Patent No.: US 11,032,981 B2
(45) Date of Patent: Jun. 15, 2021

(54) TREE PROTECTION SYSTEM

(71) Applicant: REACH SUPPLIES, LLC, Millville, NJ (US)

(72) Inventors: James Douglas Reach, Pine Hill, NJ (US); Douglas Michael Reach, Lititz, PA (US)

(73) Assignee: REACH SUPPLIES, LLC, Millville, NJ (US)

( * ) Notice: Subject to any disclaimer, the term of this patent is extended or adjusted under 35 U.S.C. 154(b) by 156 days.

(21) Appl. No.: 15/982,027

(22) Filed: May 17, 2018

(65) Prior Publication Data

US 2018/0332779 A1 Nov. 22, 2018

Related U.S. Application Data

(60) Provisional application No. 62/509,455, filed on May 22, 2017.

(51) Int. Cl.
*A01G 13/02* (2006.01)
*A01G 9/14* (2006.01)
*A01G 13/10* (2006.01)

(52) U.S. Cl.
CPC ....... *A01G 13/0243* (2013.01); *A01G 9/1438* (2013.01); *A01G 13/0237* (2013.01); *A01G 13/10* (2013.01)

(58) Field of Classification Search
CPC ............ A01G 13/0243; A01G 13/0237; A01G 13/02; A01G 13/00; A01G 9/1438; A01G 13/10; A01G 13/04; F16B 21/082
See application file for complete search history.

(56) References Cited

U.S. PATENT DOCUMENTS

| | | | | |
|---|---|---|---|---|
| 374,170 A | * | 12/1887 | Benedict | A01G 13/0243 47/32.4 |
| 472,137 A | * | 4/1892 | McCallip | A01G 13/0243 47/32.4 |
| 862,698 A | * | 8/1907 | Bierbaum | A01G 13/0243 47/32.4 |

(Continued)

FOREIGN PATENT DOCUMENTS

| | | | |
|---|---|---|---|
| DE | 3542743 A1 | * 6/1987 | ............ A01G 13/10 |
| GB | 2519817 A | 5/2015 | |
| WO | 2016195048 A1 | 12/2016 | |

OTHER PUBLICATIONS

A.M. Leonard Tree Guard; https://www.amleo.com/leonard-rigid-plastic-mesh-tree-guards-6-in-diameter/p/VP-TTGXX/ (accessed: Mar. 2018).

(Continued)

*Primary Examiner* — Magdalena Topolski
*Assistant Examiner* — William L Gmoser
(74) *Attorney, Agent, or Firm* — McNees Wallace & Nurick LLC

(57) ABSTRACT

A tree protection system including a flexible UV-stable first layer including a plurality of openings between about 5 mm and about 9 mm formed therein, the first layer configured to protectively surround at least a base of a tree, and a unitary fastener adapted to secure overlapping opposed portions of the first layer together during protectively surrounding the at least a base of a tree in response to application of a single force directed toward the opposed portions.

10 Claims, 5 Drawing Sheets

(56) References Cited

U.S. PATENT DOCUMENTS

| | | | | |
|---|---|---|---|---|
| 2,753,662 | A * | 7/1956 | Behnke | A01G 13/04 47/29.2 |
| 5,479,741 | A * | 1/1996 | Underwood | A01G 13/0237 24/20 EE |
| 5,661,925 | A * | 9/1997 | MacMaster | A01G 13/0237 47/32.4 |
| 6,588,144 | B1 * | 7/2003 | Staggs | A01G 13/0243 47/30 |
| 9,890,536 | B2 * | 2/2018 | Lolio, Jr. | E02D 31/06 |
| 2002/0038526 | A1 * | 4/2002 | Garrote Morreres | A01G 13/0243 47/32.4 |
| 2003/0140554 | A1 | 7/2003 | Whitcomb | |
| 2004/0062892 | A1 * | 4/2004 | Vasquez | A01G 13/0237 428/36.1 |
| 2005/0170720 | A1 * | 8/2005 | Christiansen | A01G 9/1438 442/1 |
| 2007/0277433 | A1 * | 12/2007 | Stearns | A01G 13/0237 47/58.1 R |
| 2009/0133325 | A1 * | 5/2009 | Kraminer | A01G 9/24 47/31.1 |
| 2010/0077659 | A1 * | 4/2010 | Shove | A01G 13/0243 47/9 |
| 2011/0058915 | A1 * | 3/2011 | Scroggie | F16B 5/0642 411/32 |
| 2011/0258923 | A1 * | 10/2011 | Lais | A01G 13/0243 47/32.6 |
| 2013/0219783 | A1 * | 8/2013 | Toye | A01G 13/043 47/31 |
| 2014/0075839 | A1 * | 3/2014 | Ma | A01G 7/06 47/58.1 R |
| 2015/0115115 | A1 * | 4/2015 | Rocke | A01G 13/00 248/201 |
| 2015/0223411 | A1 * | 8/2015 | Toye | D03D 1/007 442/49 |
| 2015/0351330 | A1 * | 12/2015 | Toye | A44B 13/0076 47/31 |
| 2016/0081281 | A1 * | 3/2016 | Horinek | A01G 22/00 47/1.01 R |
| 2016/0120137 | A1 * | 5/2016 | Toye | A01G 13/0268 47/31 |
| 2016/0353677 | A1 * | 12/2016 | Toye | D04B 21/12 |
| 2017/0307003 | A1 * | 10/2017 | Edland | F16B 21/082 |
| 2018/0084739 | A1 * | 3/2018 | Bottari | A01G 13/105 |
| 2018/0266057 | A1 * | 9/2018 | Son | A01G 13/00 |
| 2019/0059244 | A1 * | 2/2019 | Toye | A01G 9/1438 |

OTHER PUBLICATIONS

Protex Pro/Gro Solid Tube Tree Protectors; http://www.forestry-suppliers.com/product_pages/products.php?mi=16231&itemnum= (accessed Mar. 2018).

Listemian & associates inc. Tree Guard: (Paper Brochure; Mar. 2018).

(Picture of installed tree protector) http://growingthehomegarden.com/2010/10/how-i-protect-trees-from-deer-rubbing.html (accessed Mar. 2018).

* cited by examiner

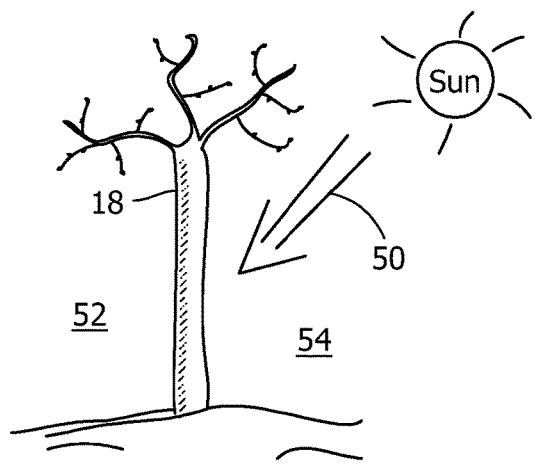
FIG. 6
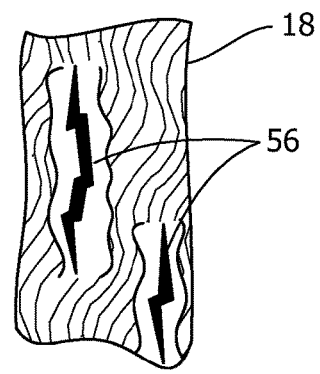
FIG. 7
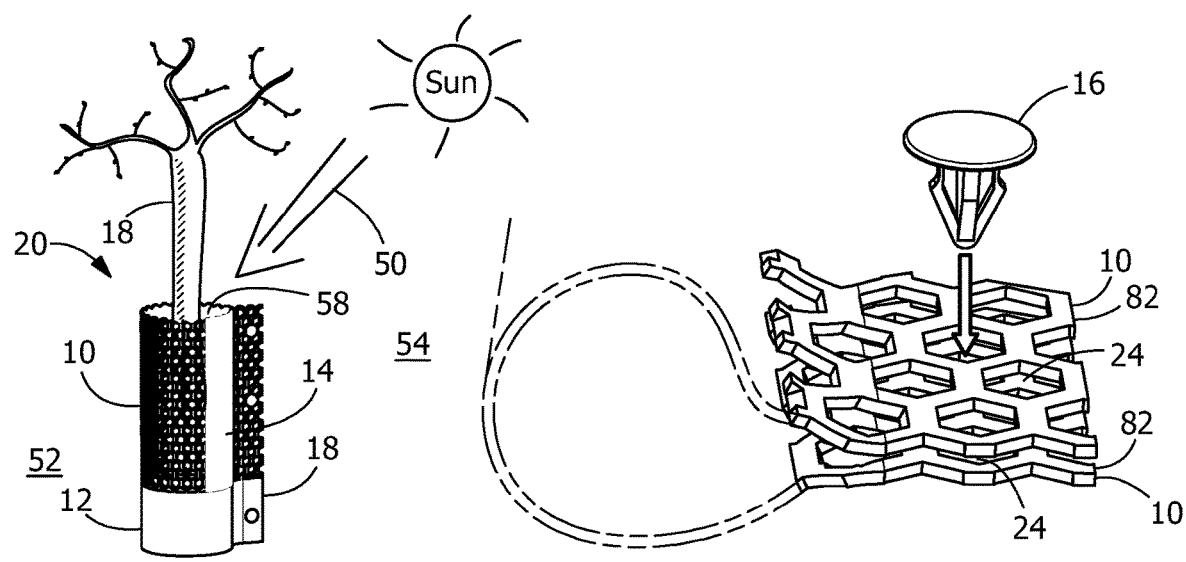
FIG. 8
FIG. 9

TREE PROTECTION SYSTEM

FIELD OF THE INVENTION

The present invention is directed to tree protection systems.

BACKGROUND OF THE INVENTION

There are numerous challenges associated with protecting trees, such as saplings from damage to at least the tree trunks by animals, such as rodents, woodpeckers and sapsucking birds, and deer. Tree trunks may also need to be protected from application of herbicides. Additionally, especially during spring, trees may be damaged by "frost cracking," in which a frozen tree trunk may split when exposed to direct sunlight on one side as a result of uneven heating on opposite sides of the tree trunk. It is also desirable to protect the trees, such as during handling, which may involve transporting, such as associated with harvesting the trees from a tree nursery.

There is a need for a tree protection system that is inexpensive and easily installed/removed.

BRIEF DESCRIPTION OF THE INVENTION

In an embodiment, a tree protection system including a flexible UV-stable layer including a plurality of openings between about 5 mm and about 9 mm formed therein, the layer configured to protectively surround at least a base of a tree. The tree protection system further including a unitary fastener adapted to secure overlapping opposed portions of the layer together during protectively surrounding the at least a base of a tree in response to application of a single force directed toward the opposed portions.

In another embodiment, the tree protection system includes a flexible UV-stable first layer including a plurality of openings between about 5 mm and about 9 mm formed therein. The tree protection system further includes a flexible UV-stable second layer overlying and secured to the first layer, the second layer impervious to at least glyphosate-based herbicides, the first layer and the second layer configured to protectively surround at least a base of a tree. The tree protection system further includes a unitary fastener adapted to secure overlapping opposed portions of the first layer together during protectively surrounding the at least a base of a tree in response to application of a single force directed toward the opposed portions.

In yet another embodiment, a tree protection system includes a flexible UV-stable first layer including a plurality of openings between about 5 mm and about 9 mm formed therein. The tree protection system further includes a flexible UV-stable second layer overlying and secured to the first layer, the second layer impervious to at least glyphosate-based herbicides, the first layer and the second layer configured to protectively surround at least a base of a tree. The tree protection system further includes a flexible UV-stable third layer at least partially overlying and secured to one of the second layer and the first layer, the third layer configured to substantially protect the at least a base from frost cracking. The tree protection system further includes a unitary fastener adapted to secure overlapping opposed portions of the first layer together during protectively surrounding the at least a base of a tree in response to application of a single force directed toward the opposed portions.

In still yet another embodiment, a tree protection system includes a tree protection system including a flexible UV-stable layer including a plurality of openings between about 5 mm and about 9 mm formed therein, the layer configured to protectively surround at least a base of a tree.

In another embodiment, a tree protection system includes a flexible UV-stable first layer including a plurality of openings between about 5 mm and about 9 mm formed therein. The tree protection system further including a flexible UV-stable second layer overlying and secured to the first layer, the second layer impervious to at least glyphosate-based herbicides, the first layer and the second layer configured to protectively surround at least a base of a tree.

In yet another embodiment, a tree protection system including a flexible UV-stable first layer including a plurality of openings between about 5 mm and about 9 mm formed therein. The tree protection system further includes a flexible UV-stable second layer overlying and secured to the first layer, the second layer impervious to at least glyphosate-based herbicides, the first layer and the second layer configured to protectively surround at least a base of a tree. The tree protection system further includes a flexible UV-stable third layer at least partially overlying and secured to at least one of the second layer and the first layer, the third layer configured to substantially protect the at least a base from frost cracking. Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 6 is an elevation view of a tree subjected to conditions for developing frost split.

FIG. 7 is a partial elevation view of cracks formed in a tree trunk as a result of frost split.

FIG. 8 is an elevation view of an installed exemplary tree protection system.

FIG. 9 is an elevation view of an exemplary fastener prior to insertion in overlapping layers of an exemplary tree protection system.

Wherever possible, the same reference numbers will be used throughout the drawings to represent the same parts.

DETAILED DESCRIPTION OF THE INVENTION

The tree protection system includes a layer, such as a mesh, such as a sheet of high density polyethylene (HDPE) mesh or other plastics or polymers, which, when positioned around a tree and laterally surrounding the tree trunk, provides protection to the tree from a broad spectrum of threats including rodents, woodpeckers and sapsucking birds, deer, and scraping in the field. Fasteners, such as unitary or one-piece fasteners may be used to secure the layer around and laterally surround the tree, which fasteners can easily be selectively unfastened as needed. The layer is sufficiently soft and smooth and is of sufficient thickness to prevent damage to a harvested tree during shipment. In one embodiment, the tree protection system protects trees during application of herbicides. In one embodiment the tree protection system provides protection from frost cracking. In summary, the tree protection system provides a "Swiss Army Knife" of tree protection options, as it is recognized that not all protection options may be required.

For purposes herein, HDPE may be a blend with low density polyethylene (LDPE). In one embodiment, the layer may be composed of acrylonitrile butadiene styrene (ABS), polypropylene (PP), nylon, or combination thereof.

Figure 1:
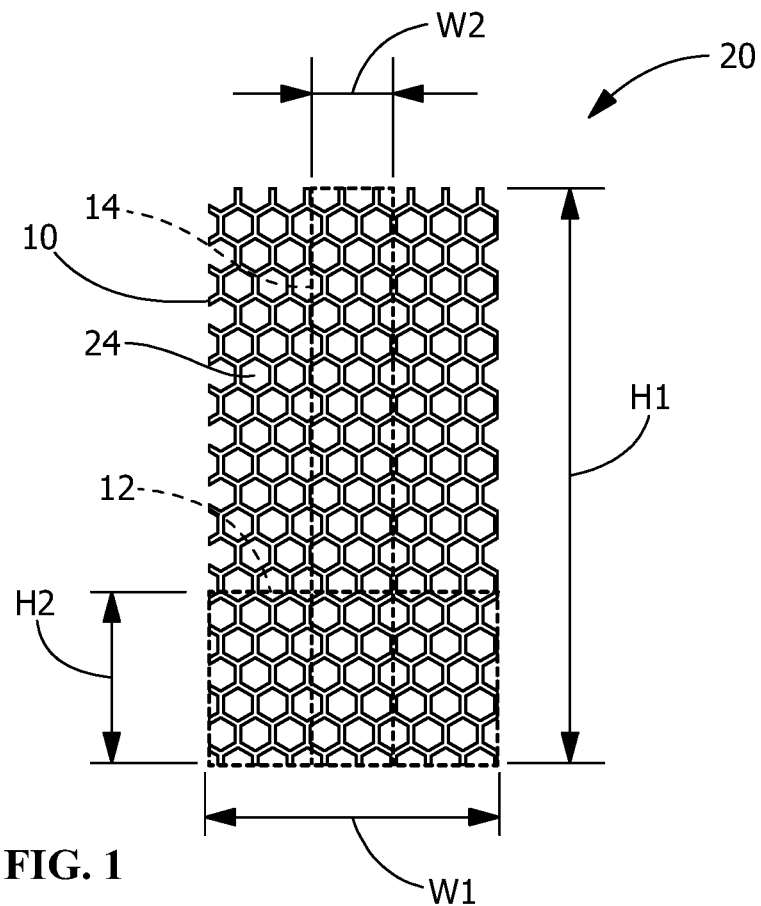
FIG. 1 is a plan view of an exemplary layer of the tree protection system.
Figure 2:
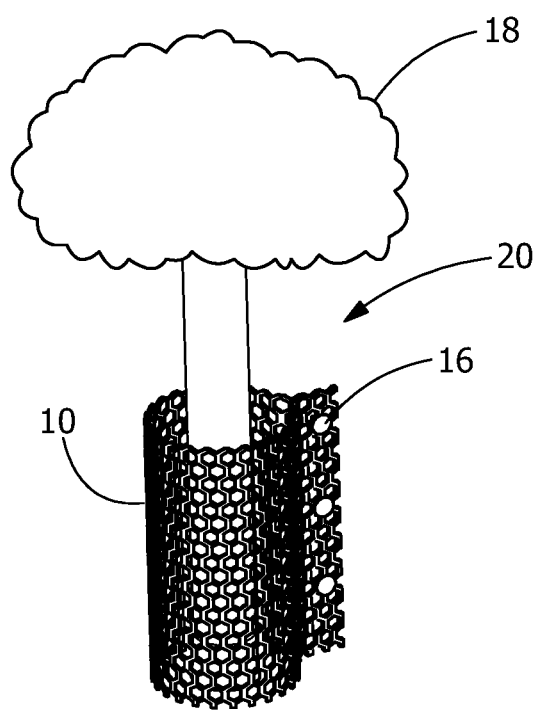
FIG. 2 is an upper perspective view of an installed exemplary tree protection system.

In one embodiment, as shown in FIG. 1, a tree protection system 20 includes a layer 10, such as a mesh. In one embodiment, layer 10 may define a rectangular flat pattern, having a height H1 and a width W1. In one embodiment, tree protection system 20 (FIG. 2) includes layer 10 that protectively wraps around a tree 18, such as around a base of the tree, in which overlapping opposed portions of layer 10 are secured by fasteners 16. Other layer geometric shapes may be used so long as the layer, when wrapped around the tree, covers the intended portion of the tree, and fasteners can secure overlapping portions of the layer together. In one embodiment of the tree protection system 20, an optional layer 12 may be secured or bonded to layer 10 and will be discussed in further detail below. As shown, layer 12 may define a rectangular flat pattern, having a height H2 and a width W1. In one embodiment, layer 12 may have a width different than layer 10, i.e., different than W1. In one embodiment of tree protection system 20, an optional layer 14 may be secured or bonded to layer 10 and will be discussed in further detail below. As further shown, layer 14 may define a rectangular flat pattern, having a height H1 and a width W2 that may be generally centered relative to width W1. In one embodiment, layer 14 may have a height different than layer 10, i.e., different than H1. In one embodiment, layer 14 may not be generally centered relative to width W1.

In one embodiment, height H1 is between about 18 inches (46 cm) and about 48 inches (122 cm), about 24 inches (61 cm) and about 48 inches (122 cm), about 24 inches (61 cm) and about 42 inches (107 cm), about 24 inches (61 cm) and about 36 inches (91 cm), about 24 inches (61 cm) and about 32 inches (81 cm), about 24 inches (61 cm), between about 32 inches (81 cm) and about 48 inches (122 cm), about 32 inches (81 cm) and about 42 inches (107 cm), about 32 inches (81 cm) and about 36 inches (91 cm), about 32 inches (81 cm), between about 36 inches (91 cm) and about 48 inches (122 cm), about 36 inches (91 cm) and about 42 inches (107 cm), about 36 inches (91 cm), between about 42 inches (107 cm), and about 48 inches (122 cm), about 42 inches (107 cm) or any suitable sub-range thereof.

In one embodiment, width W2 is between about 11 inches (28 cm) and about 19 inches (48 cm), about 11 inches (28 cm), between about 15 inches (38 cm) and about 19 inches, about 15 inches (38 cm), (48 cm), about 19 inches (48 cm) or any suitable sub-range thereof. It is to be understood that these dimensions for H1 and W1 are exemplary and in other embodiments, can be greater than or less than those dimensions. Other layer geometric shapes may be used so long as the layer(s), when wrapped around a tree, covers the intended portion of the tree, and fasteners can secure overlapping portions of the layer(s) together.

In one embodiment, layer 10 has a thickness of about 1 mm (0.04 in). In one embodiment, layer 10 has a thickness between about 1 mm (0.04 in) and about 5 mm (0.20 in), about 1 mm (0.04 in) and about 4 mm (0.16 in), about 1 mm (0.04 in) and about 3 mm (0.12 in), about 1 mm (0.04 in) and about 2 mm (0.08 in), about 2 mm (0.08 in), between about 2 mm (0.08 in) and about 5 mm (0.20 in), about 2 mm (0.08 in) and about 4 mm (0.16 in), about 2 mm (0.08 in) and about 3 mm (0.12 in), about 2 mm (0.08 in), between about 3 mm (0.12 in) and about 5 mm (0.20 in), about 3 mm (0.12 in) and about 4 mm (0.16 in), about 3 mm (0.12 in), between about 4 mm (0.16 in) and about 5 mm (0.20 in), about 4 mm (0.16 in) or any suitable sub-range thereof. In one embodiment, layer 10 has a thickness less than 1 mm (0.04 in). In one embodiment, layer 10 has a thickness greater than 5 mm (0.20 in).

Figure 3:
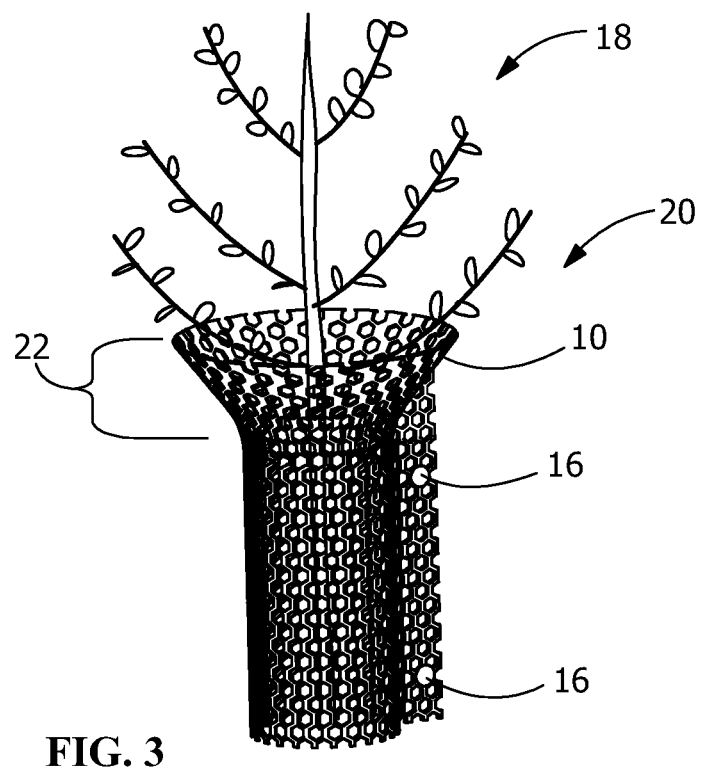
FIG. 3 is an upper perspective view of an installed exemplary tree protection system.

The layers 10, 12, 14 are each composed of flexible UV-stable material. For purposes herein, the term "UV-stable," "UV resistant," or similar is intended to define a material having the ability to resist ultraviolet (UV) light or sunlight for extended periods of time, such as months or even years and continue to function as intended. The term "flexible" or similar such as in the context of "flexible" layer or mesh or film is intended to mean that the layer or mesh or film is capable of being flexed sufficiently in order to wrap around and protectively surround a tree 18. As shown in FIG. 3, for example, an end, such as an upper end of layer 10 may be configured to form an enlarged portion 22 such as a flared portion relative to other portions of the layer surrounding tree 18. This enlarged portion 22 provides an enlarged opening to provide enhanced protection for the tree, such as around the lower branches protruding from an upper portion of the tree trunk to prevent damage to the tree, such as from sapsucking birds. In one embodiment, in which layer 10 has a height greater than the tree, an upper end of layer 10 may be folded along a line parallel to its upper end in order to reduce the height of layer 10, and at a later date the fold line may be moved in accordance with growth of the tree. In one embodiment, layer 10 is composed of high-density polyethylene (HDPE) that further incorporates carbon black into the plastic mixture, providing enhanced UV resistance and stability that is easy for an end user to verify. In one embodiment, the percentage of carbon black by weight is between about 2 percent and about 7 percent, about 2 percent and about 6 percent, about 2 percent and about 5 percent, about 2 percent and about 4 percent, about 2 percent and about 3 percent, about 2 percent, about 3 percent and about 7 percent, about 3 percent and about 6 percent, about 3 percent and about 5 percent, about 3 percent and about 4 percent, about 3 percent, about 4 percent and about 7 percent, about 4 percent and about 6 percent, about 4 percent and about 5 percent, about 4 percent, about 5 percent and about 7 percent, about 5 percent and about 6 percent, about 5 percent, about 6 percent and about 7 percent, about 6 percent, about 7 percent or any suitable sub-range thereof.

Other products on the market may be stabilized with additives, but actual UV resistance may be more difficult for the customer to confirm without specialized equipment or years of sun exposure. Unlike other products, this material can be shipped unrolled and flat to customers, reducing overall cost.

It is to be understood that the layers may be composed of any suitable UV-stable or UV resistant material, including, but not limited to plastics.

Layer 10 includes novel sizing of holes or openings 24 (FIG. 1) formed therein. In one embodiment, openings or holes 24 formed in the sheet have a maximum dimension between about 5 mm (0.20 in) and about 9 mm (0.35 in), about 5 mm (0.20 in) and about 8 mm (0.31 in), about 5 mm (0.20 in), between about 6 mm (0.24 in) and about 9 mm (0.31 in), about 6 mm (0.24 in) and about 8 mm (0.31 in), about 6 mm (0.24 in) and about 7 mm (0.28 in), about 6 mm (0.24 in), between about 7 mm (0.28 in) and about 9 mm (0.35 in), about 7 mm (0.28 in) and about 8 mm (0.31 in), about 7 mm (0.28 in), between about 8 mm (0.31 in) and about 9 mm (0.35 in), about 8 mm (0.31 in) or any suitable sub-range thereof.

Figure 4:
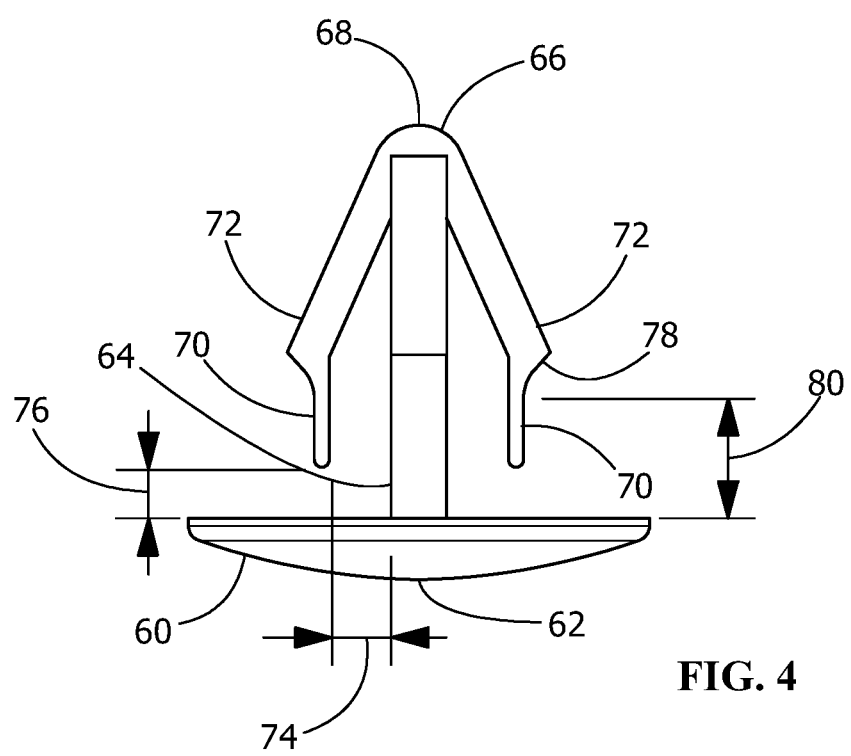
FIG. 4 is an elevation view of an exemplary fastener.

The term "maximum dimension" refers to the largest dimension of a straight line intersecting any two points along the periphery of an opening or hole. The openings or holes may define a circle, a polygon, such as a regular polygon, such as a hexagon or other closed geometry. This range of opening 24 or hole size is sufficiently large to allow sunlight 50 to come into direct contact with tree bark, aiding growth. This range of opening 24 or hole size permits wind circulation to prevent significant temperature and humidity buildup around the tree trunk. This range of opening 24 or hole size mitigates risk of insect infestation and pest nesting in an enclosed space. The openings 24 or holes are sufficiently small to provide protection to tree bark during shipping and to allow a fastener 16, such as a "button" fastener as shown in FIG. 4 to be utilized, which is discussed in further detail below, providing increased ease of use. The opening 24 or hole size is optimized to provide protection from as many animal threats as possible, including, but not limited to mice, voles, groundhogs, rabbits, woodpeckers, sapsuckers, and deer.

By virtue of the generally uniform arrangement of openings 24 in layer 10, the tree trunk does not develop shaped "tan lines" that may form on the tree trunk as a result of using a tree guard, such as a spiral tree guard, which is a helically coiled or wound strip of material that may be applied over a tree trunk.

Layer 10 or mesh includes numerous beneficial physical characteristics. For example, the mesh is sufficiently rigid when installed to maintain its shape when vertically positioned on one end or edge (i.e., stand on its own), yet sufficiently flexible to be curled or overlappingly extend around the tree. Layer 10 is also sufficiently soft and smooth with sufficiently small holes to provide protection to the trunk during shipping without causing damage to the trunk itself. Layer 10 mesh can be produced via extrusion, sheet perforation, or other suitable fabrication methods. Extruded mesh has been found by Applicant to cost less and have greater durability compared to perforated sheeting.

Figure 5:
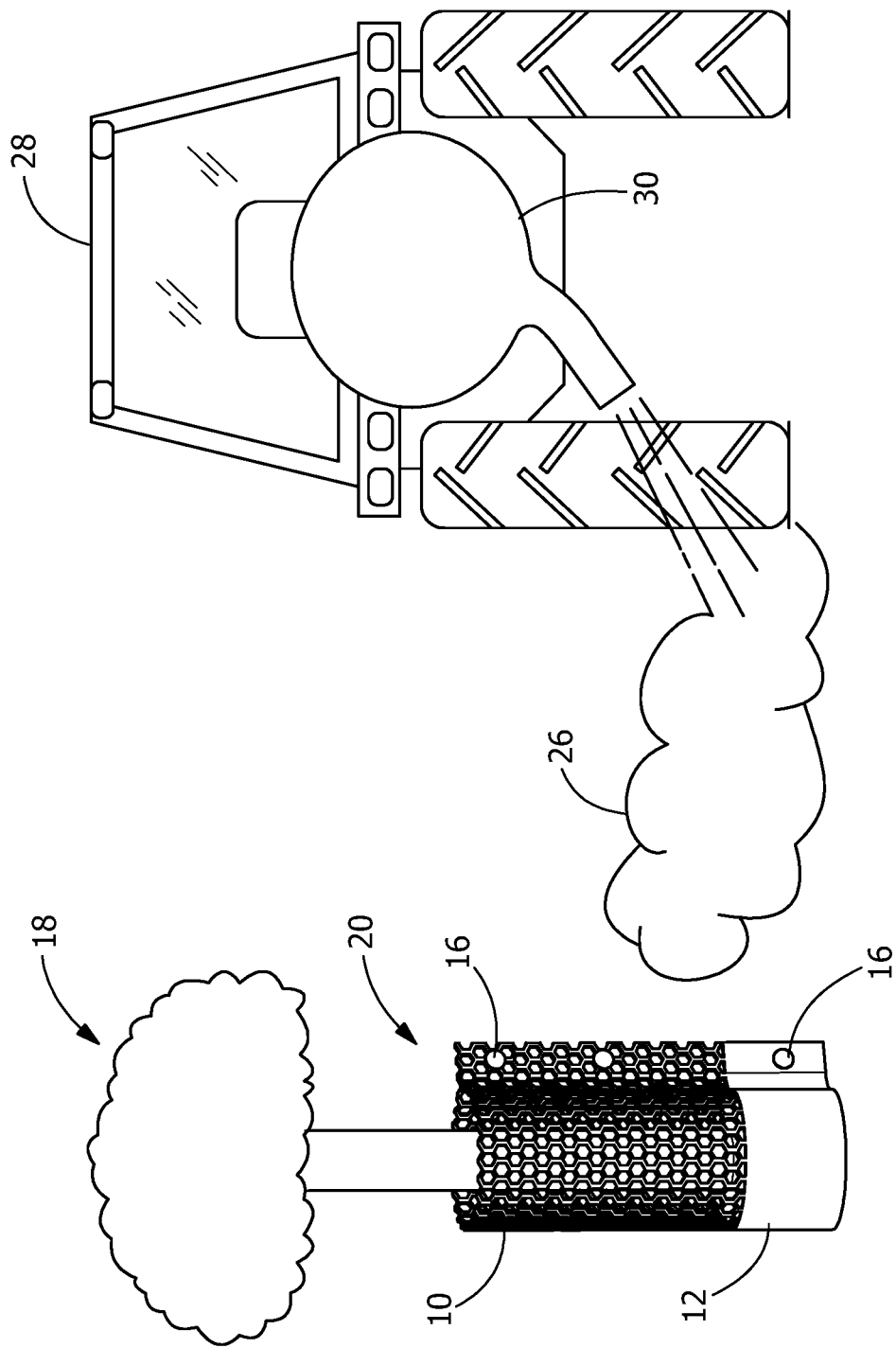
FIG. 5 is an elevation view of an installed exemplary tree protection system.

In one embodiment, tree trunk protection system 20 incorporates a novel herbicide spray protection layer 12 or film. When bonded to layer 10, film layer or layer 12 provides trees 18 with protection from local herbicide application applied low to the ground, such as shown in FIG. 5. That is, tree trunk protection system 20 facilitates the machine application, such as by a vehicle 28 incorporating a herbicide applicator 30 of herbicide 26 (including, but not limited to glyphosate-based herbicides, by itself or in any combination thereof with other non-glyphosate-based herbicides) to large volumes of trees, such as trees arranged in multiple rows in a manner similar to other cash crops, reducing costs typically associated with more precise and expensive manual application. In one embodiment, this layer 12 or film that is impervious to the herbicide is a thin layer of polymer such as a vinyl-based or low-density polyethylene plastic which is then bonded, such as by heat or adhesive to the layer 10. In one embodiment, the layer 12 is white or a suitable light color. As a result of layer 12 or film being nonporous and utilizing a suitable light color, heat absorption is minimized around the tree trunk, especially when layer 12 or film faces the tree when installed to protectively surround the tree. In one embodiment, the layer 12 is translucent to allow some light exposure on base of the tree trunk. In one embodiment, the translucent layer permits 45 percent light exposure, although in another embodiment, the percent of light exposure may 22 percent or less. In one embodiment, the thickness of the film layer 12 is between about 0.5 mil and about 12 mil, about 0.5 mil and about 10 mil, about 0.5 mil and about 8 mil, about 0.5 mil and about 6 mil, about 0.5 mil and about 4 mil, about 0.5 mil and about 2 mil, about 0.5 mil and about 1 mil, about 0.5 mil, between about 1 mil and about 12 mil, about 1 mil and about 10 mil, about 1 mil and about 8 mil, about 1 mil and about 6 mil, about 1 mil and about 4 mil, about 1 mil and about 2 mil, about 1 mil, between about 2 mil and about 12 mil, about 2 mil and about 10 mil, about 2 mil and about 8 mil, about 2 mil and about 6 mil, about 2 mil and about 4 mil, about 2 mil, between about 4 mil and about 12 mil, about 4 mil and about 10 mil, about 4 mil and about 8 mil, about 4 mil and about 6 mil, about 4 mil, between about 6 mil and about 12 mil, about 6 mil and about 10 mil, about 6 mil and about 8 mil, about 6 mil, between about 8 mil and about 12 mil, about 8 mil and about 10 mil, about 8 mil, between about 10 mil and about 12 mil, about 10 mil, about 12 mil or any suitable sub-range thereof.

Thicker plastic layers are more expensive, less flexible, and more difficult to bond to other layers. Thinner material tears easily, especially during heat treatment. UV-resistance is particularly important if film layer material is vinyl-based. The ability to easily apply a herbicide protection layer 12 or film of varying translucencies, thicknesses, and colors in any combination as appropriate is a beneficial feature of the system.

Thicker layer 10 or mesh is beneficial to the heat application of the layer 12 or film in that some rigidity in the layer 10 or mesh is maintained immediately after application bonding. Thinner layers 10 or meshes heat more quickly and thoroughly, increasing the probability of deformation during the manufacturing process. A smooth and flat layer 10 or mesh surface is likewise beneficial in achieving a strong bond with the layer 12 or film.

In one embodiment, the tree protection system 20 incorporates a novel and beneficial frost protection layer 14 or film. As shown in FIG. 6, tree 18 having a frozen trunk has the tendency to split or develop cracks 56 (FIG. 7) when exposed to direct sunlight 50 on one side, i.e., a sunlit side 54, as a result of uneven heating on opposite sides (sunlit side 54 versus a shaded side 52) of the tree trunk. By reducing uneven heat exposure to the tree trunk, the film helps reduce the risk of frost cracking. (www.missouribotanicalgarden.org/gardens-gardening/your-garden/help-for-the-home-gardener/advice-tips-resources/pests-and-problems/environmental/winter-injury/frost-cracks.aspx) FIG. 8 shows an exemplary tree protection system 20 protectively surrounding tree 18, in which layer 14 is positioned on sunlit side 54 between the sun and the tree trunk to prevent exposure of the tree trunk to direct sunlight 50.

In an exemplary embodiment, a vertical layer 14 sheet of film is bonded to the layer 10 or mesh as depicted in FIGS. 1 and 8. Optionally, layer 12 or film may be included for herbicide protection, as previously discussed. In one embodiment, layer 12 is composed of polyethylene, copolymer, polyvinyl, polycarbonate, or combination thereof. In one embodiment, the plastic surface of layer 14 or film facing away from the trunk is white or a sufficiently light color to reflect light, while an opposed inner lining 58 of the layer 14 or film composed of a similar material is black or a sufficiently dark color to ensure opacity. The holes or openings 24 (FIG. 1) in the layer 10 or mesh allow breathability and limit the greenhouse effect inside the film barrier protectively surrounding the tree. During spring, the season in which trees are generally most at risk from frost splits, the layer 14 or film is intended to face east, toward the sun in the morning when the trunk is coldest. After spring, the layer 14 or film may be rotated to the north or south to allow the trees direct sun exposure.

The frost protection film may be applied in a process similar to the bonding process for the spray protection film.

The tree trunk protection system 20 is compatible with a beneficial fastener 16 (FIG. 4). Conventionally, products relating to tree trunk protection are most frequently fastened with hog ring staples, zip ties, string, or plastic tape. All of these methods are relatively labor intensive.

Referring to FIG. 9, by employing a fastener 16, such as a plastic fastener that secures both overlapping layers of the protection system in one motion or a single force, application or installation of the tree trunk protection system 20 is accomplished more quickly and easily.

Figure 10:
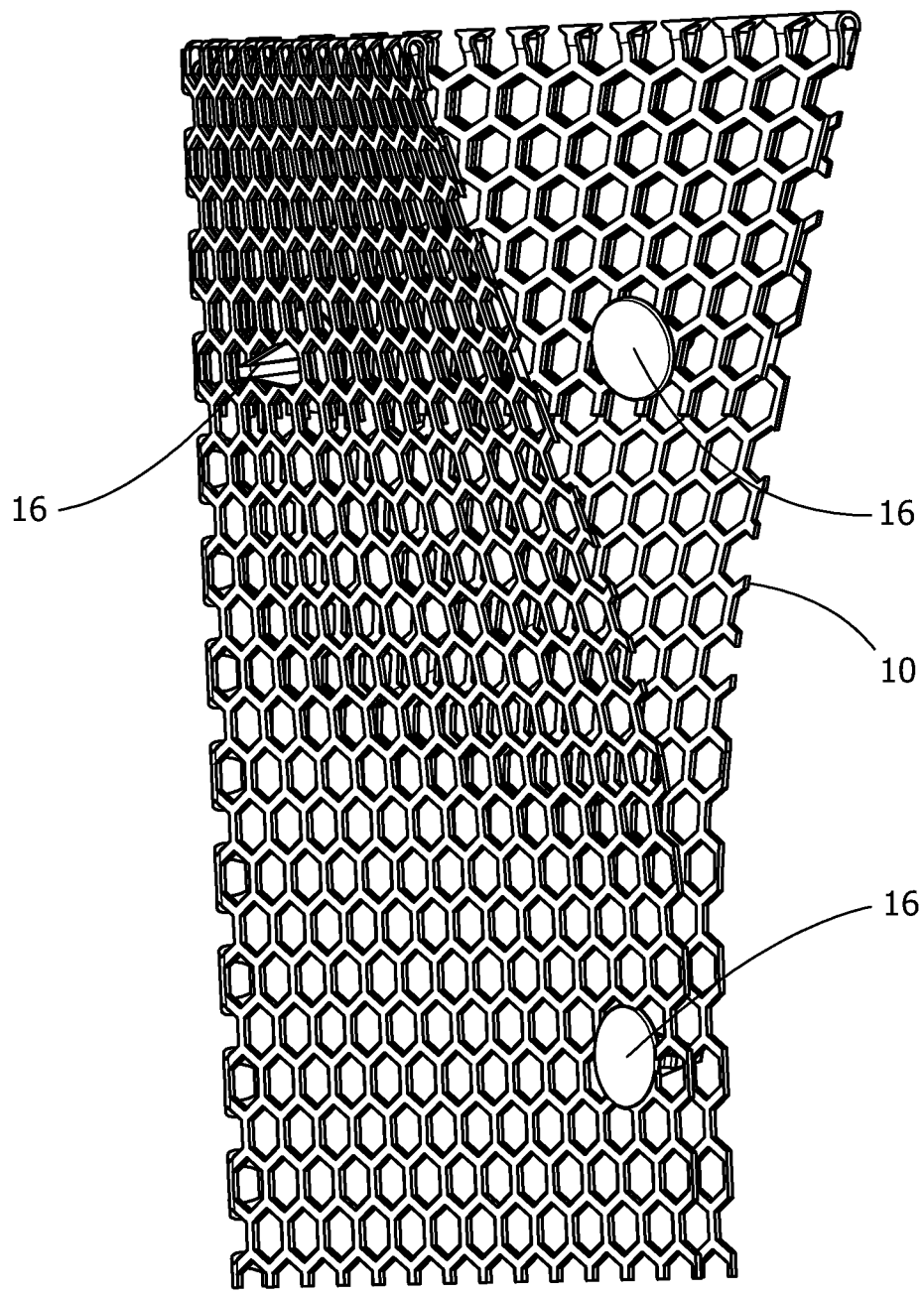
FIG. 10 is an enlarged, partial elevation view of an exemplary tree protection system.

In one embodiment, small fasteners such as those used in auto manufacturing that are ultimately intended for use with plastic panels are suitable for the novel application of fastening a plastic mesh around a tree 18. The design of fastener 16 shown in FIG. 4 specifically accommodates attributes of the layer 10 or mesh and protective layers 12, 14 or film bonded to it. Fastener 16 such as a button fastener is a unitary or one-piece construction comprising a head 60 at an end 62. A stem or shaft 64 extends from head 60 to an opposed end 66, defining a tip 68. A pair of resilient prongs 70 extend toward head 60 and radially outwardly from shaft 64, forming a "V shape". In another embodiment more than two prongs 70 may be used. The term "resilient" and similar as in "resilient prong" means the prong may be elastically deformed such as in response to a force, with the prong having a retention force to return the prong to an undeformed position when the prong is no longer subjected to the force. One beneficial attribute relates to prong width or the distance between prongs 70 of fastener 16. In one embodiment, fasteners 16 are sized to accommodate 5 mm-8 mm mesh openings as previously discussed, the mesh having, for example, a 2 mm cord diameter. At least the maximum distance between undeflected outside surfaces 72 or outside-outside width of the prongs 70 is larger than the maximum size of openings 24 (FIG. 1) in the mesh or layer 10 (FIG. 1) or mesh. FIG. 9 shows fastener 16 prior to being secured to opposed ends 82 of layer 10 or mesh in response to application of a single force toward the opposed ends 82 of layer 10 or mesh. The prongs 70 are compressed as the fastener 16 is pushed through corresponding openings 24 of the mesh or layer 10 and at least partially released once fully inserted, preventing the fastener 16 from falling out or being inadvertently removed. Increasing the shaft 64 or stem length on the fastener 16 allows it to fasten multiple layers of mesh together. By cuffing or folding the topmost portion, such as several inches of the layer 10 or mesh onto itself, such as shown in FIG. 10, a large mesh sheet or layer 10 may be quickly reduced in size to fit a small tree with low branches and later uncuffed to continue to provide protection to the trunk as the tree grows.

Another beneficial attribute included with the fastener 16 is a prong stem or prong shaft gap 74. The gap 74 between the prongs 70 and the stem or shaft 64 is sufficiently wide such that the prongs 70 may be elastically compressed to less than a predetermined distance from each other, such as to permit insertion inside of openings 24 (FIG. 9), such as 5 mm as the fastener 16 is applied or secured to the layer 10 or mesh. However, the gap 74 is not so large that one prong 70 can slip out of the mesh opening 24 if the fastener 16 is pushed to one side of the opening.

Yet another beneficial attribute included with the button fastener 16 is a differential stem or shaft length 76. In one embodiment, the stem or shaft 64 has a differential stem or shaft length 76 as compared to the length of the prongs 70 sufficient to allow the prongs 70 to completely tear through both the film layers 12, 14, as well as the layer 10 or mesh. With a shorter differential stem or shaft length 76, the prongs 70 can only partially penetrate layers 12, 14 or films, permitting the layers 12, 14 or films to remain wrapped around the prongs 70, compressing the prongs. The compressed prongs 70 may permit the inadvertent removal of the fastener 16, since the prongs 70 cannot achieve a secure lock. An elongated stem or shaft 64 having a sufficient differential stem or shaft length 76 allows the prongs 70 to extend through the film layers 12, 14, ensuring that the layer 10 or mesh is fastened securely with minimal effort by the user.

Alternately, as further shown in FIG. 4, prongs 70 of fastener 16 includes a tapered portion 78 formed between opposed ends of the prongs, such as a distance 80 between head 60 and tapered portion 78. That is, even if the collective thicknesses of layers 10, 12, 14 is equal to distance 80 such that prongs 70 cannot fully penetrate layers 10, 12, 14 and one or more of these layers remain wrapped around prongs 70, tapered portion 78 prevents inadvertent removal of the fastener 16. This feature permits easy temporary removal of the fasteners 16 from one layer of the mesh while remaining fixed in the other layer, as well as easy subsequent refastening of the fasteners 16 to the mesh. In one embodiment, all of the fasteners 16 utilize this adaptation. This temporary removal will allow the user to easily unfasten and refasten at least the lower section of the mesh, permitting direct access to the base of the tree 18, for reasons such as measuring the diameter of the otherwise protected tree 18. By remaining fastened to one side of the mesh when the mesh is opened, the fasteners 16 are prevented from completely separating from the trunk protection system 20. This feature makes the system easily reusable after removal, prevents inadvertent loss of fasteners 16, and prevents fastener litter.

Returning to FIG. 4, the fastener 16 includes a beneficial tip 68. The tip of the button is rounded to aid in puncturing the film layer, but not so pointed as to scrape trees it may come in contact with during shipping. The term "rounded" and the like includes circular, ovular, blunt curved surface or combination thereof.

In one embodiment, the button fastener or fastener 16, as previously discussed, is composed of black PA6 Nylon to ensure UV stability and structural integrity when used outdoors.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A tree protection system comprising:
    a single flexible UV-stable first layer including a plurality of openings between 5 mm and 9 mm formed therein, the plurality of openings defining a single generally uniform arrangement of openings across the entire surface area of the single flexible UV-stable layer, one surface of the plurality of openings of the flexible UV-stable first layer exposed to a surrounding environment, the flexible UV-stable first layer being sufficiently rigid when protectively surrounding the base of the tree to maintain its shape when vertically positioned on one edge of the flexible UV-stable first layer;
    a flexible UV-stable second layer overlying and secured to the flexible UV-stable first layer, the flexible UV-stable second layer impervious to at least glyphosate-based herbicides, the flexible UV-stable first layer and the flexible UV-stable second layer configured to protectively surround a base of a tree, the flexible UV-stable second layer exists around the base of the tree, and the flexible UV-stable first layer extends vertically past the flexible UV-stable second layer;
    wherein the flexible UV-stable first layer having a first height and the flexible UV-stable second layer having a second height approximately ⅓ of the first height and the flexible UV-stable second layer having a second width;
    a flexible UV-stable third layer overlying and secured to at least a portion of the flexible UV-stable first layer extending vertically past the flexible UV-stable second layer, the flexible UV-stable third layer having a third width less than a first width of the flexible UV-stable first layer; and
    a unitary fastener separate from the flexible UV-stable first layer adapted for insertion through aligned openings of the plurality of openings of overlapping opposed portions of the flexible UV-stable first layer, the aligned openings positioned along opposed ends of the flexible UV-stable first layer, to secure the overlapping opposed portions of the flexible UV-stable first layer together during protectively surrounding the base of the tree in response to application of a single force directed toward the opposed portions.

2. The tree protection system of claim 1, wherein the first flexible UV-stable layer has a thickness between 1 mm and 5 mm, and the second flexible UV-stable layer has a thickness between 0.5 mil and 12 mil.

3. The tree protection system of claim 1, wherein the first flexible UV-stable layer is composed of a group consisting of high density polyethylene, low density polyethylene, acrylonitrile butadiene styrene, polypropylene, nylon or combination thereof, and the second flexible UV-stable layer is composed of polyethylene, copolymer, polyvinyl, polycarbonate, or combination thereof.

4. The tree protection system of claim 1, wherein the fastener further comprises:
    a head at a first end;
    a shaft extending from a center of the first end to a second end defining a tip; and
    at least two resilient prongs extending from the tip toward the first end;
    wherein the at least two resilient prongs defining a V shape, each prong includes a radially inwardly directed tapered portion formed between opposed ends by the V-shaped prongs having a predetermined spacing from the head to releasably securingly engage the overlapping opposed portions of the flexible UV-stable layer in response to insertion of the tip and the tapered portions of the at least two resilient prongs through aligned openings of the plurality of openings of the overlapping opposed portions of the flexible UV-stable layer.

5. The tree protection system of claim 4, wherein the tip is rounded.

6. A tree protection system comprising:
    a single flexible UV-stable first layer including a plurality of openings between 5 mm and 9 mm formed therein, the one surface of the plurality of openings of the flexible UV-stable first layer exposed to a surrounding environment, the flexible UV-stable first layer being sufficiently rigid when protectively surrounding the base of the tree to maintain its shape when vertically positioned on one edge of the flexible UV-stable first layer;
    a flexible UV-stable second layer overlying and secured to the flexible UV-stable first layer, the flexible UV-stable second layer impervious to at least glyphosate-based herbicides, the flexible UV-stable first layer and the flexible UV-stable second layer configured to protectively surround a base of a tree, the flexible UV-stable second layer exists around the base of the tree, and the flexible UV-stable first layer extends vertically past the flexible UV-stable second layer;
    wherein the flexible UV-stable first layer having a first height and the flexible UV-stable second layer having a second height approximately ⅓ of the first height and the flexible UV-stable second layer having a second width; and
    a flexible UV-stable third layer overlying and secured to at least a portion of the flexible UV-stable first layer extending vertically past the flexible UV-stable second layer, the flexible UV-stable third layer having a third width less than a first width of the flexible UV-stable first layer.

7. The tree protection system of claim 1, wherein the plurality of openings is a plurality of polygonal openings.

8. The tree protection system of claim 7, wherein the plurality of polygonal openings is a plurality of hexagonal openings.

9. The tree protection system of claim 6, wherein the plurality of openings is a plurality of polygonal openings.

10. The tree protection system of claim 1, wherein the overlapping opposed portions include corresponding portions of a same surface of the opposed ends are brought into contact with one another.

* * * * *